United States Patent
Li et al.

(10) Patent No.: US 9,297,907 B1
(45) Date of Patent: Mar. 29, 2016

(54) REAL TIME RADIATION MONITORING USING NANOTECHNOLOGY

(71) Applicant: The United States of America as Represented by the Administrator of NASA, Washington, DC (US)

(72) Inventors: Jing Li, San Jose, CA (US); Richard T. Wilkins, College Station, TX (US); James J. Hanratty, San Francisco, CA (US); Yijiang Lu, San Jose, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 102 days.

(21) Appl. No.: 14/205,003

(22) Filed: Mar. 11, 2014

Related U.S. Application Data

(60) Provisional application No. 61/776,439, filed on Mar. 11, 2013.

(51) Int. Cl.
| | |
|---|---|
| *G01T 1/16* | (2006.01) |
| *G01T 1/28* | (2006.01) |
| *G01T 1/29* | (2006.01) |
| *G01T 1/02* | (2006.01) |
| *B82Y 15/00* | (2011.01) |

(52) U.S. Cl.
CPC . *G01T 1/16* (2013.01); *B82Y 15/00* (2013.01); *G01T 1/02* (2013.01); *G01T 1/28* (2013.01); *G01T 1/2935* (2013.01)

(58) Field of Classification Search
CPC .............. G01T 1/02; G01T 1/16; G01T 1/28; G01T 1/2935; B82Y 15/00
See application file for complete search history.

(56) References Cited

U.S. PATENT DOCUMENTS

| | | | |
|---|---|---|---|
| 4,642,463 A | 2/1987 | Thoms | |
| 7,205,544 B2 | 4/2007 | Bushberg | |
| 2010/0193695 A1* | 8/2010 | Yeow et al. | 250/370.07 |
| 2011/0081724 A1* | 4/2011 | Swager et al. | 436/57 |

OTHER PUBLICATIONS

Boul, et al., Single Wall Carbon Nanotube Response to Proton Radiation, Journal of Physical Chemistry C, Jul. 22, 2009, 14467-14473, 113, American Chemical Society.

* cited by examiner

*Primary Examiner* — David Porta
*Assistant Examiner* — Mindy Vu
(74) *Attorney, Agent, or Firm* — John F. Schipper; Robert M. Padilla; Christopher J. Menke

(57) ABSTRACT

System and method for monitoring receipt and estimating flux value, in real time, of incident radiation, using two or more nanostructures (NSs) and associated terminals to provide closed electrical paths and to measure one or more electrical property change values ΔEPV, associated with irradiated NSs, during a sequence of irradiation time intervals. Effects of irradiation, without healing and with healing, of the NSs, are separately modeled for first order and second order healing. Change values ΔEPV are related to flux, to cumulative dose received by NSs, and to radiation and healing effectivity parameters and/or μ, associated with the NS material and to the flux. Flux and/or dose are estimated in real time, based on EPV change values, using measured ΔEPV values. Threshold dose for specified changes of biological origin (usually undesired) can be estimated. Effects of time-dependent radiation flux are analyzed in pre-healing and healing regimes.

20 Claims, 8 Drawing Sheets

REAL TIME RADIATION MONITORING USING NANOTECHNOLOGY

ORIGIN OF THE INVENTION

The invention described herein was made in the performance of work under a NASA contract and by employees of the United States Government and is subject to the provisions of Public Law 96-517 (35 U.S.C. §202) and may be manufactured and used by or for the Government for governmental purposes without the payment of any royalties thereon or therefore.

FIELD OF THE INVENTION

This invention relates to real time monitoring of receipt of ionizing radiation, using nanostructure devices.

BACKGROUND OF THE INVENTION

Monitoring of receipt of ionizing radiation (e.g., from high energy ions, X-rays, gamma rays, electrons, protons and/or neutrons) is normally done after the fact, using conventional dosimetry techniques and other processes that reflect the results of settled processes. One disadvantage of this approach is that, where receipt of incident radiation causes reactions or material changes that must be responded to promptly, intervention of long time intervals (hours to days) before the results are known may not be acceptable.

What is needed is a system that promptly and unambiguously responds to receipt of such radiation and that permits a prompt response to these results, either manually or in an automated manner. Preferably, the system should provide an estimate of the type of radiation received and/or of the energy range and/or of the flux or dose. Preferably, the system should permit recycling without physical change of the radiation test substances.

SUMMARY OF THE INVENTION

These needs are met by the invention, which provides a system and procedure for real time (i.e., prompt) monitoring of some effects on single wall or multi-wall carbon nanotubes ("SWCNTs" or "MWCNTs") immediately after irradiation of the SWCNTs with high flux, medium energy proton beams or other radiation beams. After irradiation ceases, some of these effects continue to develop.

A first embodiment of the invention relies upon real time measurements of some effects of exposure of one or more SWCNTs with a flux (e.g., $10^x/cm^2/sec$ with x=3-11) at one, two or more medium energy levels (e.g., 10 MeV and 40 MeV) of a proton (hydrogen ion) beam. The SWCNTs, unloaded, doped or coated with metal catalysts or with selected polymers, are part of a chemical sensor array that uses a pair of interdigitated electrodes ("IDEs"), connected by an array of two or more SWCNTs to form part of an electrochemical cell and a closed electrical circuit. A transfer of electrical charge from one electrode to the other electrode passes through one or more SWCNTs, whose charge transfer characteristics are changed in response to receipt of radiation. By measuring change of electrical conductivity or another electrical property value {"ΔEPV") of the SWCNT array, the flux can be estimated. For a particular ion beam, the cumulative dose can then be determined. This sensor array possesses high sensitivity, low power, robustness, and low cost compared with other commercial chemical sensors, which is suitable for detection of trace amounts of incident radiation.

DESCRIPTION OF THE INVENTION

Figures 1A, 1B:
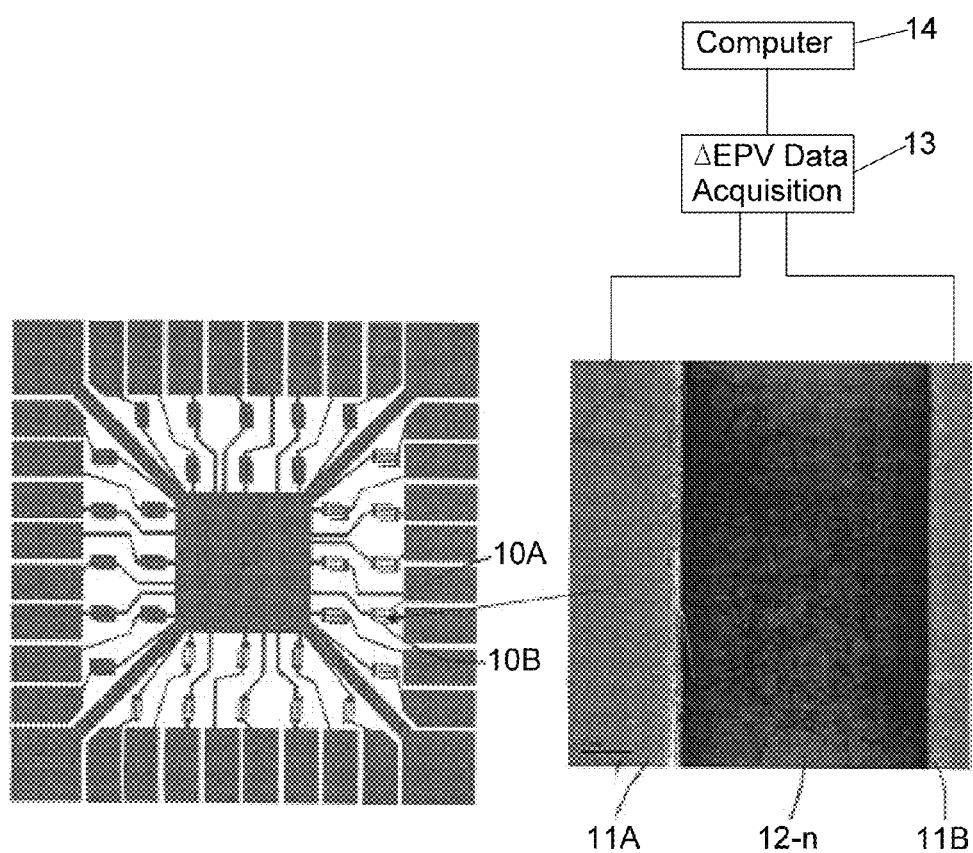
FIGS. 1A and 1B are schematic views of two interdigitated electrodes ("IDEs") with carbon nanotubes ("CNTs") or other carbon nanostructures ("CNSs") connecting the two electrodes and indicating geometric parameters for two electrodes and a CNT extending between the two electrodes.

FIGS. 1A and 1B are a schematic view of a sensor array and a scanning electron micrograph (SEM), of three electrodes 11-$p$ (p=1, 2, . . . , P; P≥3), of adjacent, interpenetrating conductive "fingers" of interdigitated electrode ("IDE") components (FIG. 1A), electrically connected by an assembly of N carbon nanotubes ("CNTs") 12-$n$ (n=1, 2, . . . , N; N≥2). A plurality of CNTs 12-n, preferably SWCNTs or MWCNTs, extends between at least two of the electrodes, located on different fingers of the respective IDE components. At least one IDE component (control) with CNTs is "unloaded," having no coating or doping or other functionalization process impressed thereon. One or more IDE components with CNTs is modified by coating or doping ("loading") or other functionalization, using a selected loading substance, such as metal catalysts (Ti, Ta, Pt, Pd, Ni, etc.) for CNT doping or polymers (e.g., hydroxypropyl cellulose, sulfonated polymer, etc.) for CNT coatings. After, or contemporaneous with, receipt of radiation, one or more electrical property values ("EPVs") for one or more of these IDE components is determined, individually or collectively, using a ΔEPV sensing mechanism 13 for EPV change associated with at least first and second electrodes and a computer 14 that is programmed to receive the ΔEPV measurements, and to calculate and present at least one (1) one ΔEPV (EPV change) measurement and (2) an estimation of cumulative radiation parameters (energy range(s), flux(es), accumulated flux (dose) and/or irradiation time interval(s)) sensed by a corresponding CNT, using ΔEPV measurement(s) that are sensed by a ΔEPV sensing mechanism 13 and are analyzed and displayed by a computer 14. Optionally, the computer 14 provides an alphanumeric display and/or a graphical display of the ΔEPV measurement(s) and/or of the cumulative radiation estimates. These estimates will be based upon calibration measurements taken in known radiation fields.

The EPV change value sensed may be voltage difference, electrical current, electrical resistance, electrical conductance, impedance, capacitance or another related electrical parameter. The ΔEPV sensing mechanism 13 is adapted to provide one or more measurements of an EPV change value at a sequence of one, two or more times, t=$t_m$ (m=1, . . . ) contemporaneous with receipt of the radiation by the CNTs 12-$n$. The IDEs, the CNTs, the ΔEPV sensing mechanism 13 and the computer 14 comprise a real time radiation sensor or sensor array, with ΔEPV measurements processed and displayed within about 10-30 sec after the last measurement is made. The P electrodes and N connected CNTs form part of an electrochemical cell, whose circuit path may be completed by passing current through the AEPV sensing mechanism.
Initial Experiment.

Figure 2:
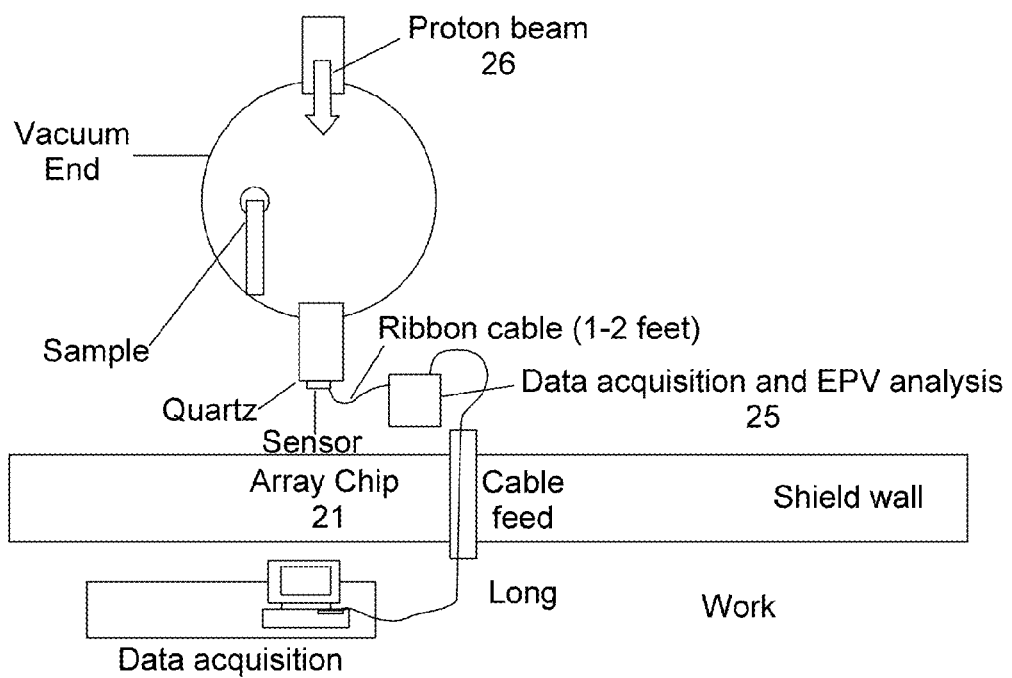
FIG. 2 is a schematic view illustrating use of the IDE/CNT arrangement of FIGS. 1A and 1B to estimate, in real time, radiation that has been recently received in an initial test.

In one embodiment, illustrated in FIG. 2, an initial sensor array 21 includes 32 sensing elements, including 8 pristine (not functionalized) SWCNT sensing devices for evaluating repeatability and reproducibility. The sensor array 21 includes a ΔEPV data acquisition and analysis mechanism 25 for each of the nanostructures.

In one embodiment, the initial radiation source is provided by Radiation Effects Facility at The Texas A & M University Cyclotron Institute. Proton beams can be delivered from a proton beam source 26 with a high degree of uniformity over a 1.8-inch×1.8-inch (4-cm by 4-cm) cross sectional area for measurements inside the vacuum chamber and 1-inch (2.54-cm) diameter circular cross sectional area for the in-air station. Uniformity is achieved by means of magnetic defocusing of the beam. The intensity or flux of any beam is easily regulated over a broad range spanning several orders of magnitude, at the user's request, in a matter of seconds. The target exposure system is fully automated. Exposure can be set for a certain time, or total accumulated radiation, or can be manually stopped at any time.

As part of a feasibility experiment, a SWCNT-based chemical sensor array was tested in real time through exposure of one or more SWCNTs, with and without dopings and/or coatings, for a constant flux ϕ−2×10$^7$/cm$^2$/sec proton beam irradiation at two energy levels (10 MeV and 40 MeV) and five accumulated flux levels of interest (Φ=5×10$^x$ cm$^{-2}$ with x=7, 8, 9, 10, 11). More generally, an energy range of 1-100 MeV is of interest with different fluxes, ϕ=10$^y$/cm$^2$/sec (y=3-11). Non-constant flux (ϕ=10$^7$/cm$^2$-sec, increasing monotonically to 10$^{11}$/cm$^2$-sec) was also studied.

A sensor chip with an array of 32 sensors was placed outside of the chamber directly under a quartz window, with each sensor being individually wired, as illustrated in FIG. 2. Multiplexing data from the 32 channels was implemented. A constant current was applied to each channel, and a voltage change was measured during the proton beam exposure. The sample rate was set at 1 Hz. A flux of about 2×10$^7$ protons/cm$^2$/sec was initially directed onto the chip with subsequent doses up to 5×10$^{11}$/cm$^2$. The sensor data were recorded continuously during the proton exposure as well as with the proton beam off for energy level adjustment.
Discussion of Initial Test Results.

Figure 3:
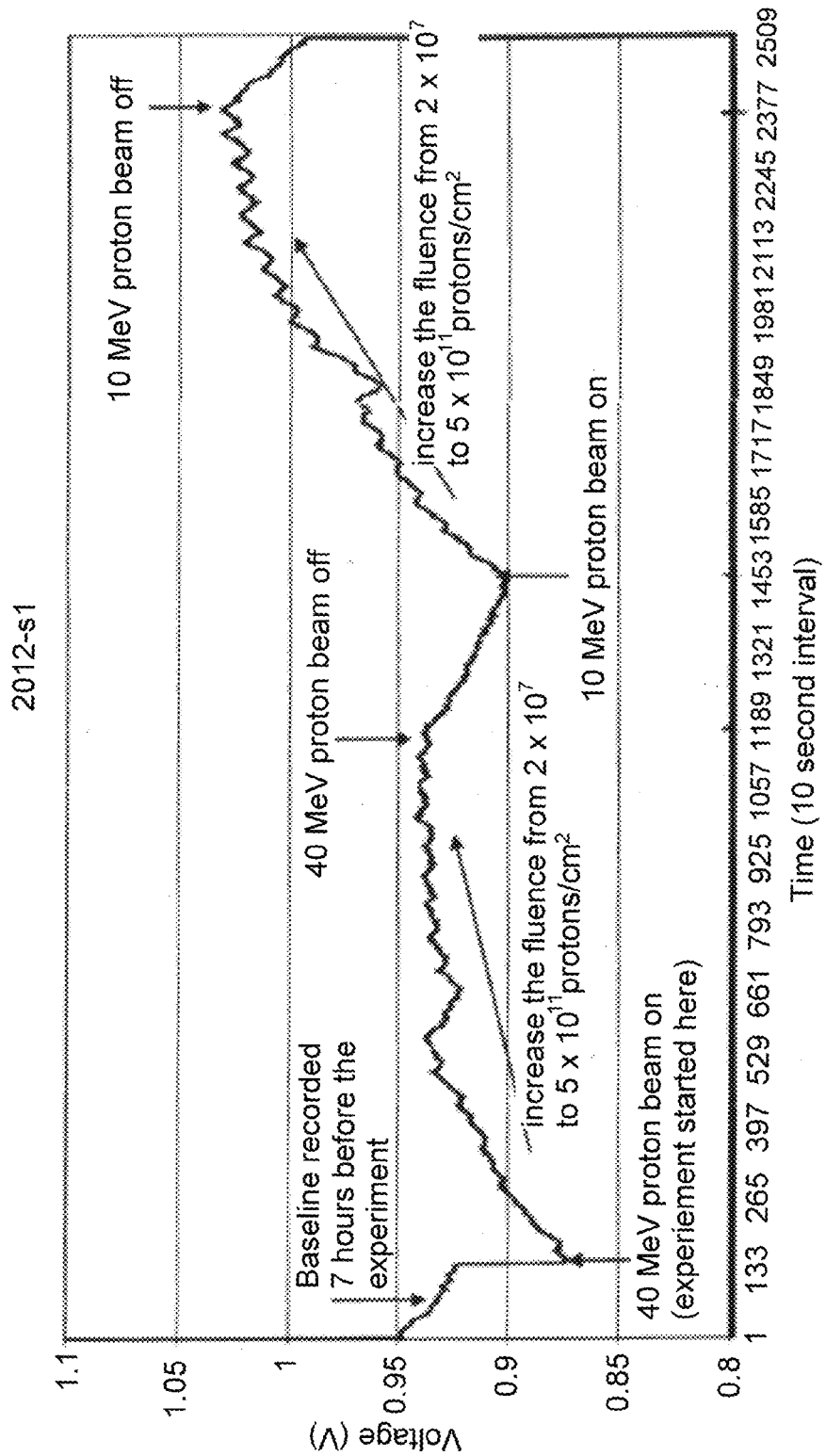
FIG. 3 is a graphical view of voltage change measurements (ΔEPV) in a constant current circuit with cumulative radiation, delivered at a varying proton beam flux ($10^7$–$10^{11}$ protons/$cm^2$-sec).

The 32-sensor array on a silicon chip was tested under the proton exposure at two energy levels with nearly constant flux. The test results indicate that CNT-based chemical sensors are sensitive to, and discriminate between, proton exposure at different levels of energy and exposure, and that the sensors may partly or fully recover after the proton beam is turned off. A typical sensor response curve (conductance) of a pristine SWCNT sensor is shown in FIG. 3 (constant current) for each energy level. Eight pristine SWCNT sensors show repeatable responses to proton beam exposure.

The results indicate that: (1) the CNT-based chemical sensors are not destroyed or rendered inactive by the proton beam at doses higher than that in the solar system for a mission length of the order of years; protons received from solar flares have doses Φ≈2×10$^{11}$/cm$^2$ so that these sensors can be safely used in space; and (2) two types of sensors (Pd-doped CNTs and cellulose-coated CNTs) are very sensitive to proton beam exposure, and each of these sensors changes its electrical conductivity with changing doses and changing energy levels. These sensors can be used for radiation detection at doses up to and above solar flare dose levels (estimated at 2×10$^{11}$/cm$^2$). From previous studies, these doping and coating materials are sensitive to presence of hydrogen gas molecules and of hydrogen ions. Where a cellulose coating is used, protons appear to be detected by binding to an OH group in the coating material. Where Pd doping (or, by analogy, Pt or Ni or Ti or Ta) is used, the Pd appears to attract H after exposure to the protons.

As irradiation proceeds, the number of CNT sites that interact with, and are thereby changed by, the radiation beam particles increases and the number of unaffected sites decreases correspondingly. For a constant flux ϕ, measured in particles/cm$^2$/sec, a decrease in fraction f=f(t;unaf) of unaffected sites (not yet converted by receipt of radiation) can be represented by a first order differential equation, $$df/dt = -\kappa \cdot (f - f_\infty) \quad (t0 \leq t \leq t3), \tag{1}$$

where $f_\infty$ is an estimated asymptotic value of f with no healing present (e.g., $f_\infty$=0), κ=κ(ϕ,E) is a measure of radiation effectiveness of the particle flux ϕ where healing is not present, also dependent on energy E and radiation particle type; average particle energy E is assumed to be known here In the absence of "healing" (reconversion to an unaffected state), a solution of Eq. (1) with initial condition f(t=t0)=f0 is $$f(t;unaf) = f_\infty + (f_0 - f_\infty)\exp\{-\kappa(t - t0))\} \quad (t \geq t0). \tag{2}$$

By providing measurements, f(t1) and f(t2), of the unaffected site fraction f(t;unaf) at two distinct times, t1 and t2 (>t1≥t0), one verifies that $$\{f(t2;unaf) - f_\infty\}/\{f(t1;unaf) - f_\infty\} = \exp\{-\kappa(t2 - t1)\}, \tag{3}$$

$$\text{rad. effectiveness } \kappa = \kappa(\phi,E) = ln\{\{f(t1;unaf) - f_\infty\}/\{f(t2;unaf) - f_\infty\}\}/(t2 - t1), \tag{4A}$$

$$\text{dose } \Phi = \phi(t2 - t1), \tag{4B}$$

$$f_0 = f(t1;unaf)\exp\{\kappa(\cdot t1 - t0)\}. \tag{4C}$$

$$f_\infty = f(t1;unaf) - \{f(t1;unaf) - f(t2;unaf)\}\{1 - \exp\{-\kappa(t2 - t1)\}\}. \tag{4D}$$

Thus, measurement of two finite, spaced apart values, f(t1; unaf) and f(t2;unaf), allows an estimate of the asymptotic value $f_\infty$, which may be 0, if healing is not present.

In the absence of healing, discussed in the following, the value $f_\infty$ represents the smallest value of f(t;unaf), or, alternatively, a largest cumulative effect of the incident radiation. This asymptotic value can be compared with a value f(biol) that is associated with a known biological effect (usually undesirable) of such radiation.

Through experimentation for a specified particle beam (e.g., X-rays, neutrons, protons, other charged ions, electrons) of various energies, one can determine or estimate κ(ϕ,E) as a function of the flux ϕ, and energy E, or of the cumulative flux or dose Φ When κ(ϕ,E) and $f_0$ are estimated or measured for a specified particle beam with an unknown flux, this rate can be estimated through knowledge of these functions and the measurement-based estimates of κ and f0. Computation time for the flux ϕ is estimated to be no more than a fraction of 1 sec, after the measured values f(t1;unaf) and f(t2;unaf) are provided. Thus, real time monitoring of dose or flux is provided, where healing is negligible or absent.

Effects of initiation of healing (with abrupt change in slope $\Delta_2 f(t4) = (d^2f/dt^2)_{t4+0} - (d^2f/dt^2)_{t4-0}$ can be included in a simplified manner by incorporating two assumptions: (1) healing occurs after the reacted site fraction, $1-f(t;\text{unaf})$, increases to a threshold value, $1-f_{thr}$ at $t=t4$, which is a rough measure of collective ability of adjacent reacted sites to respond to and react with each other; and (2) for $t>t4$, healing occurs (2-i) at a rate that is linearly proportional to the difference, $f_{thr}-f(t;\text{heal}) (\geq 0)$ or (2-ii) at a rate that is quadratically dependent upon $f(t;\text{heal})$.

The conditions (1) and (2-i) can be analyzed using a first modified form of Eq. (1) for unreacted fraction $f(t;\text{heal};1)$ with healing present:

$$df/dt = -\kappa(f-f_\infty) \ (0 \leq t \leq t4, f(t=t4;\text{unaf}) = f_{thr}) \quad (5A)$$

$$df/dt = -\kappa \cdot (f-f_\infty) + \mu\{f_{thr}-f\} = -(\kappa+\mu)\{f-f_h\}, (f(t4)=f_{thr}; t \geq t4) \quad (5B)$$

$$f_h = (\kappa/(\kappa+\mu))f_\infty + (\mu/(\mu+\kappa))f_{thr}, \quad (5C)$$

$$= f_\infty + (\mu/(\kappa+\mu))(f_{thr}-f_\infty) \quad (5D)$$

$$= f_{thr} + (\kappa/((\kappa+\mu))(f_\infty - f_{thr}), \quad (5E)$$

$$t4 - t0 = (-1/\kappa) \ln\{f_0/f_{thr}\}, \quad (5F)$$

$$\Delta_1 f(t4;\text{heal};1) = (df/dt)_{t4+0} - (df/dt)_{t4-0} = 0, \quad (5G)$$

$$\Delta_2 f(t4;\text{heal};1) = (d^2f/dt^2)_{t4+0} - (d^2f/dt^2)_{t4-0} = \mu\kappa(f_{thr}-f_\infty), \quad (5H).$$

where the healing effectivity parameter $\mu$ is likely to be less than $\kappa$, and to be weakly dependent, if at all, on $\phi$ and/or on E. Normally, $f_\infty < f_{thr}$, so that $f(t;\text{heal};1)$ approaches an asymptotic value (Eq. (5E)) that is less than $f_{thr}$: $f(t;\text{heal};1)$ continues to decrease after healing begins for constant flux $\phi$. A solution of Eq. (5B) is $$f(t;\text{heal};\mathbf{1}) = (f_{thr}-f_h) \exp\{-(\mu+\kappa)(t-t4)\} + f_h. \quad (6)$$

The solution component $f(t;\text{heal};1)$ has a continuous slope of $-\kappa f_{thr}$ at transition ($t=t4$) and will tend to a non-zero asymptotic value below $f_{thr}$, as $t \to \infty$, namely, $$f(\text{asymp};\text{heal};1) = \cdot f_h, \quad (7)$$

as $t$ increases beyond $t4$. This healing behavior is illustrated in FIG. 3,

Variation of $\kappa$ and $\mu$ with flux $\phi$ (or with cumulative dose $\Phi$) and with energy E can be estimated experimentally from measurements of $f(t;\text{unaf})$ and $f(t;\text{heal};1)$ for a given particle beam, fixed particle energy, and specified flux. In a pre-heal regime, the parameter $\kappa(\phi,E)$ may increase or decrease monotonically (or be substantially constant) with increasing flux $\phi$ in a selected flux range, assumed measurable or known and represented schematically in FIG. 4 (pre-heal regime) for two different types of radiation particles and constant E. A curve $\kappa(\phi,E)$ will likely approach an asymptote for high flux values. Variation of the parameter $\kappa(\phi,E)$ with flux $\phi$ can be estimated from Eq. (4A). One advantage of use of Eqs. (2) and (6B) is that real time estimates can be made of maximum permissible time of exposure time to the radiation.

Variation of the sum $\kappa+\mu$ with flux can be estimated as follows. From Eq. (6), one verifies that, for choices of observation times $t6-t4=2(t5-t4)$ (>0), $$r1 = \{f(t5;\text{heal};1) - f(t4;\text{heal};1)\}/\{f(t6;\text{heal};1) - f(t4;\text{heal};1)\} = 1/(1+w), \quad (8A)$$

$$w = \exp\{-(\kappa+\mu)(t5-t4)\} = (1/r1) - 1, \quad (8B)$$

$$\kappa(\phi,E) + \mu(\phi,E) = -\ln\{(1/r1) - 1\}/(t5-t4) \quad (8C)$$

$$\mu(\text{est}) = \{\kappa(\phi,E) + \mu(\phi,E)\}\text{est} - \kappa K(\text{est}). \quad (8D)$$

As noted in the preceding, it is possible that the parameter $\mu$ depends weakly, or not at all, on flux $\phi$. and/or energy E.

The conditions (1) and (2-ii) can be analyzed using a second modified form of Eq. (1) for unaffected fraction $f(t;\text{heal};2)$ with healing present:

$$df/dt = -\kappa(f-f_\infty) \ (t0 \leq t \leq t4), \quad (9A)$$

$$df/dt = af^2 + 2bf + c = a(f-f1)(f-f2) \ (\neq 0; t \geq t4), \quad (9B)$$

$$f(t0) = f_0, \quad (9C)$$

$$f(t4) = f_{thr}, \quad (9D)$$

$$f2, f1 = -(b/a) \pm \{(b/a)^2 - c/a\}^{1/2}, \quad (9E)$$

$$\Delta f(t;\text{heal};2) = af_{thr}^2 + (2b-\kappa)f_{thr} + c - \kappa f_\infty, \quad (9F)$$

where $f1$ and $f2$ (>$f1$) are attractor values for the healing regime unaffected fraction $f$ of radiation-receiving units in the monitor system and are assumed to be measurable or known.

Figure 6:
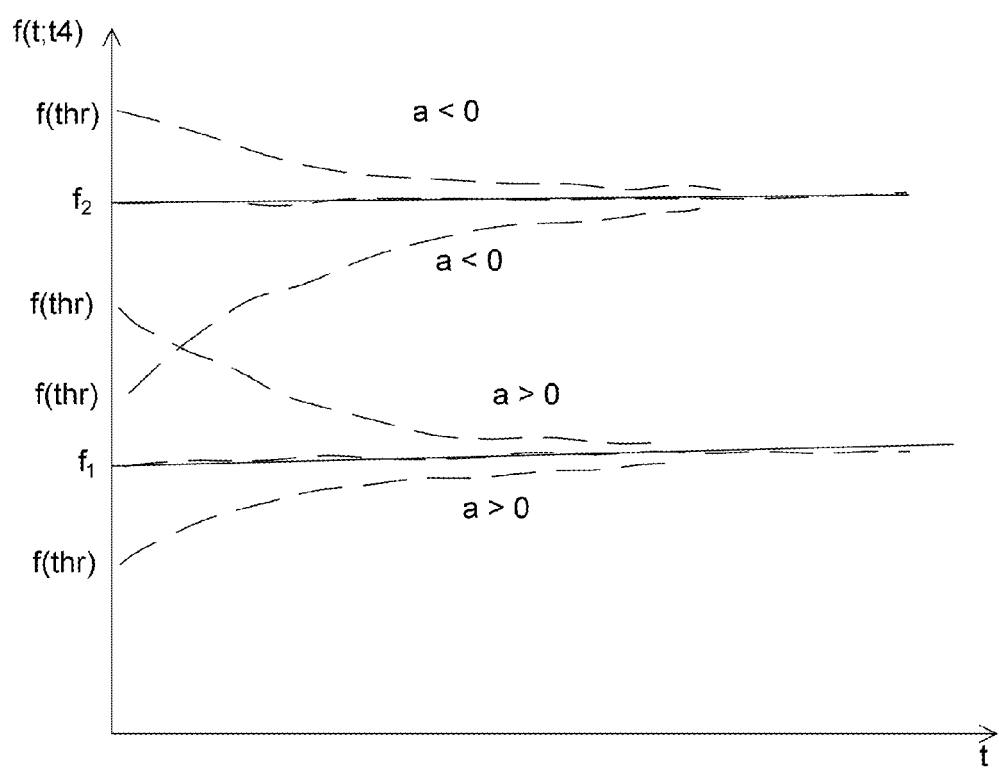
FIG. 6 illustrates f-asymptotes in a pre-healing situation.

The signum of a and the value of $f_{thr}$ will determine which asymptotic value $f(t)$ approaches in the limit of large t:

$$f_{thr} < f < f1; a > 0: \lim f(t \to \infty) = f1, \quad (10A)$$

$$f1 < f_{thr} < f2; a > 0: \lim f(t \to \infty) = f1, \quad (10B)$$

$$f1 < f_{thr} < f2; a < 0: \lim f(t \to \infty) = f2, \quad (10C)$$

$$f1 < f2 < f_{thr}; a < 0: \lim f(t \to \infty) = f2, \quad (10C)$$

as illustrated in FIG. 6.

A solution of Eq. (9B) is $$f(t;\text{heal};2) = f2 + (f2-f1)/\{\chi \exp\{-\alpha(t-t4)\} - 1\}, (t \geq t4), \quad (11A)$$

$$\chi = (f_{thr}-f1)/(f_{thr}-f2), \quad (11B)$$

$$\alpha = a(f2-f1). \quad (11C)$$

$$\lim_{t \to \infty} f(t;\text{heal};2) = f1 \ (a > 0)$$

$$= f2 \ (a < 0) \quad (11D)$$

The parameters $\chi$ and $\alpha = a(f2-f1) = 2\{b^2 - 4ac\}^{1/2}$ are related by at least one consistency relation, expressed as $$r2 = \{f(t6;\text{heal};2) - f(t5;\text{heal};2)\}/(t6-t5) \ (\text{measured}) = \chi (x^2-x)/\{(\chi x^2-1)(\chi x-1)\}, \quad (12A)$$

$$x = \exp\{-\alpha(t5-t4)\}, \quad (12B)$$

$$x^2 = \exp\{-\alpha(t6-t4)\}, \quad (12C)$$

$$r2\chi^2 x^3 - (1+r2)\chi(x^2-x) + r2 = 0, \quad (12D)$$

$$\alpha = 2\{b^2 - ac\}^{1/2} = \{\ln(1/x)\}/(t6-t5), \quad (12E)$$

where $t5$ and $t6$ are chosen, relative to $t4$ and to each other, to satisfy Eqs. (12B) and (12C). One or two additional relations between a measurable quantity, such as the ratio $r2$ and expressions involving $f(t;\text{heal};2)$, are needed to estimate the values of the parameters $a, b, c, f1$ and/or $f2$.

Each of the quantities, $$\Delta_1 f(t4;\text{heal};2) = \{df/dt\}_{t4+0} - \{df/dt\}_{t4-0} = a(f_{thr}-f1)(f_{thr}-f2) - \kappa f_{thr}, \quad (13A)$$

$$\Delta_2 f(t4;\text{heal};2) = \{d^2f/dt^2\}_{t4+0} - \{d^2f/dt^2\}_{t4-0},$$

$$= a^2(f_{thr}-f1)(f_{thr}-f2)(2f_{thr}-f1-f2) - (\kappa)^2 f_{thr}, \quad (13B)$$

may change abruptly, with values that can be positive, negative or zero, depending upon whether the threshold parameter value $f_{thr}$ lies within, or outside of, an interval between $f1$ and $f2$. Where an abrupt change occurs (at $t=t4$, whose value is not yet determined), this may indicate a change from a pre-healing regime to a particular healing regime, such as the one described by Eq. (5B) or (9B). As noted in the preceding, the quantities f1 and f2 are probable asymptotic values for f in the healing regime, in the sense that f(t;heal;2) approaches f1 from above or below, or approaches f2 from above or below, as time increases without limit.

FIG. 6 illustrates differential voltage response, V(t)/V(t0)−1, for five flux/energy situations in a single graph: (1) initially, (φ,E)=(2×10$^7$/cm$^2$-sec, E=40 MeV), with flux increasing monotonically to (2) (φ,E)=(5×10$^{11}$/cm$^2$-sec, E=40 MeV) over a 1256-sec interval; (3) (φ,E)=(0,0) for a 264-sec interval; (4) (φ,E)=(2×10$^7$/cm$^2$-sec, E=10 Mev), with flux increasing monotonically to (5) (φ,E)=(5×10$^{11}$/cm$^2$-sec, E=10 MeV) over a 1324-sec interval.

For times 133 (sec)≤t≤550 (sec), the measured voltage increases from an estimated initial value V(t=133)=0.87 Volts to an estimated value V(t=550)=0.93 Volts. At t=550 sec, healing or a similar reaction begins, and the voltage decreases from 0.93 Volts to 0.925 Volts over the following 111-sec interval. This post-healing behavior might have continued; but at t=661 sec, the flux was increased monotonically from an initial φ=2×10$^7$ to φ=5×10$^{11}$, until a time t=1189 sec. In an interval 1189≤t≤1453 sec, the 40 MeV proton beam was turned off (φ=0), and the sensor array appears to have recovered further, with voltage decreasing to 0.90 Volts.

At t=1453 sec, a 10 MeV proton beam with initial flux f=2×10$^7$ was turned on, and voltage increased from 0.90 Volts to 0.92 Volts at 1849 sec, where healing or a similar reaction began, continuing until an estimated time 1900 sec, where the voltage had decreased to 0.91 Volts. For a final interval (1900≤t≤2377 sec), the voltage again creased from 0.91 Volts to 1.025 Volts. From time of initiation of the 40 MeV beam until appearance of the first healing behavior, an estimated 416 sec expired. From time of initiation of the 10 MeV beam until appearance of the second healing behavior, an estimated 396 sec expired. The cumulative dose in each of these two intervals is estimated to be substantially the same, which is consistent with the corresponding time intervals (416 sec versus 396 sec). This may indicate that initiation of healing behavior is dependent upon cumulative flux (fluence) but is only weakly dependent upon particle energy (40 MeV versus 10 MeV). When healing begins (at t=550 sec and at t=1849 sec), the ΔEPV(t;t0) value and the corresponding fraction value f(t;heal) subsequently decrease from their threshold values, as predicted in connection with the discussion of Eq. (7). The numerical values recited in the preceding two paragraphs are estimates, based upon the graph in FIG. 6.

The situation numbered (1) will manifest a monotonic change (increase or decrease) of ΔEPV(t;t0) with cumulative radiation received Φ and may increase monotonically (not necessarily linearly) with Φ, if the dose Φ (assumed to monotonically increase with time t) is below a determinable threshold dose Φ(thr) for this type of radiation, in the absence of subsequent healing. This is seen in FIG. 6, for a time interval t1=128 ≤t(sec)≤t2=509, where ΔEPV(t;t0)=Δ(voltage) increases approximately linearly with passage of time t and with increase in dose Φ.

After substantial healing is initiated, as in situation (2) (e.g., in a time interval t4=509≤t(sec)≤t5=636), while irradiation continues at a constant flux, the change in EPV (i) may increase, but at a lower flux, as reflected in Eq. (6B) for f(t;heal;1 or (ii) may reverse direction, as reflected in Eq. (10B) for f(t;heal;2) with f1<f$_{thr}$<f2. This reversal of direction appears to occur in the time intervals 509≤t(sec)≤636 and t(sec)≈1779. The effects in (i) or in (ii) reduce the magnitude |ΔEPV| 0f the change with increasing values of Φ, as illustrated in FIG. 3 in the time interval t4=636≤t(sec)≤t5=1144.

When beam irradiation is turned off (situation (3)), as occurs in the time interval 1144≤t(sec)≤1525 in FIG. 6, healing may continue, and the nanostructure recovers toward (but does not reach) its original condition, shown by a decrease in ΔEPV(t;t0) and Δf(t) to a values less than its previous maximum value. This is illustrated in FIG. 3 in the time interval 1144≤t(sec)≤1525. Note that for the time interval 1525≤t (sec)≤2287, where irradiation again resumes with a different proton energy level, the approximately linear increase of ΔEPV with dose Φ resumes, but with a different value of the coefficient α. This may indicate one or more effects of the preceding healing and of the preceding cumulative irradiation. The measured effects of cumulative radiation may depend upon the processes and process parameters that preceded the present irradiation process.

One procedure for determining cumulative dose Φ or flux φ is the following. The change value ΔEPV for the electrical property value EPV is likely to increase approximately linearly in magnitude with cumulative change Δf in fraction f of unreacted sites (ΔEPV=η1+η2•Δf or Δf=(ΔEPV−η1)//η2), where f(t=t0;unaf)=f0 initially (healing absent) and f(t=t4; heal)=f$_{thr}$ initially (healing present). In this approach, the measured quantities ΔEPV(t) serve as surrogates for the unreacted fraction f(t;unaf) (t<t4) and for the unreacted-plus-healed fraction f(t;heal) (t≥t4). In appropriate situations, the linear)relations adopted in the following Eqs. (14A) and (14B) can be extended to quadratic, cubic or quartic polynomials in the change values ΔEPV.

The proportionality parameters η1 and η2 are determined experimentally or empirically and will depend upon the electrical property EP, the nature of the radiation-CNT interaction, and the incident radiation particle energy level E:

$$\Delta EPV(t;t0)=\eta 2\, \Delta f(t;unaf)+\eta 1 \quad (t0\le t<t4) \tag{14A}$$

$$=\eta 4\, \Delta f(t;heal)+\eta 3, \quad (t4<t) \tag{14B}$$

where η1 and η2, or η3 and η4, can be estimated from measurements of ΔEPV(t;t0) at several distinct times, with a specified flux φ and/or specified energy E in each regime. For the pre-heal regime and a specified choice of flux φ, one verifies that $$\Delta EPV(ti;t0)=EPV(t1)-EPV(t0)=\eta 1+\eta 2\{f_0\{\exp\{-\kappa(ti-t0)\}-f_0\}\ (i=1,2,3), \tag{15A}$$

$$\eta 1=0, \tag{15B}$$

$$\eta 2=\Delta EPV(t1)/\{f_0 \exp\{-\kappa(t1-t0)\}-f_0), \tag{15C}$$

For an initial healing regime (t4≤t≤t5), the defining relations become $$\Delta EPV(t4;t5)=EPV(t5)-EPV(t4)=\eta 3+\eta 4\, \Delta f(t;heal), \tag{16A}$$

$$\Delta f(t;heal)=f(t;heal)-f(t4;heal), \tag{16B}$$

$$\eta 3=f(t4;heal)=f_{thr}, \tag{16C}$$

$$\eta 4=\{EPV(t5)-EPV(t4)\}/(f(t5;heal)-f(t4;heal)), \tag{16D}$$

where f(t;heal) refers to f(t;heal;1) or to f(t;heal;2).

For two selected irradiation times, t=t1 and t=t2 (>t1), in the pre-healing regime, Eq. (4A) provides an estimate of radiation effectivity parameter κ(φ,E) from estimates of two fractions, f(t1;unaf) and f(t2;unaf), of unreacted sites. After determination of the value κ(φ,E), an estimate of specified energy E and flux φ (incident radiation) is provided, using data such as the curves in FIG. 4, assumed to be known, in a range where κ(φ,E) is either substantially constant or varies monotonically or strictly monotonically with flux φ. An estimate of dose Φ is determined from Eq. (4B), whether or not flux φ is time dependent.

Assuming that a, b, c, f1 and f2 are known, an estimation of the parameters η3 and η4 in Eq. (14B) can be made. In the healing regime corresponding to the conditions (1) and (2-ii), Eqs. (4A) and (8C) are used to separately estimate κ and μ as functions of the flux φ (and possibly energy E). The discussion associated with Eqs. (12A)-(12E) contributes to estimation of the parameters a, b and c, as functions of the flux φ (and possibly energy E). The parameters η3 and η4 may be (but need not be) substantially equal to the parameters η1 and η2, respectively. However, it is preferable to compute η3 and η4 independently.

Figure 4:
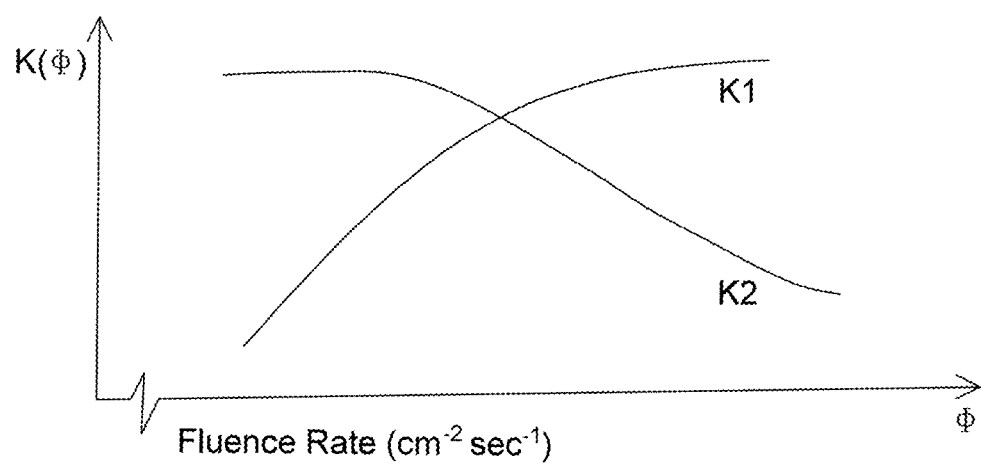
FIG. 4 graphically displays a schematic variation of radiation effectivity parameter κ with radiation flux, for two distinct types of radiation particles

In the estimation of the parameters η1 and η2, or of η3 and η4, provision of observations of change value ΔEPV(t;t0) for one specified flux φ may suffice, or a plurality of flux values φ may be required. Note the possible non-trivial dependence of κ and/or μ and/or a and/or a, b, c on the flux φ (e.g., as indicated in FIG. 4) and/or on particle energy E, The approximations in Eqs. (15A) and (16A) are not intended to imply that ΔEPV(t;t0) varies linearly with dose Φ or with flux φ, although this linear approximation may be useful over a limited interval in φ.

The preceding formalism can be applied to estimate time of occurrence of a threshold cumulative dose of radiation Φ(thr)=φΔt(thr) (e.g., beyond which undesirable biological effects will occur) for a given radiation source and a given recipient. Preferably, the dose received should stay below this threshold amount. In a pre-healing regime with substantially constant flux, this dose is reached at a cumulative time of exposure estimated to be $$\Delta t(thr) = \Phi(thr)/\phi. \quad (17A)$$

For a flux φ(t) that varies with time t, the cumulative time of exposure is estimated by a relation $$\Phi(thr) = \int_{t0}^{t(thr)} \phi(t') dt' \quad (17B)$$

The relation (17B) would be used, for example, in the situation illustrated in FIG. 3, where the particle flux φ(t) varies from $2 \times 10^7$/sec-cm$^2$ to $5 \times 10^{11}$/sec-cm$^2$.

The relation (17A) or (17B) is used, whether or not healing is present (t≤t4 or t>t4), because the focus is on the effect of such radiation on a biological organism (e.g., a human), not on reaction with an (inanimate) radiation monitor. The radiation monitor of this invention may undergo healing, but an organism exposed to this radiation will continue to absorb and respond to the incident radiation. The quantity Φ(thr) is determined from biological measurements and may depend upon the recipient's body, the type(s) of radiation particles, the energy E and/or the flux φ. The flux is determined from Eq. (4B) and a determination of φ from the graph of κ(φ,E) versus φ in FIG. 4. This comparison can be automated.

Figure 5A:
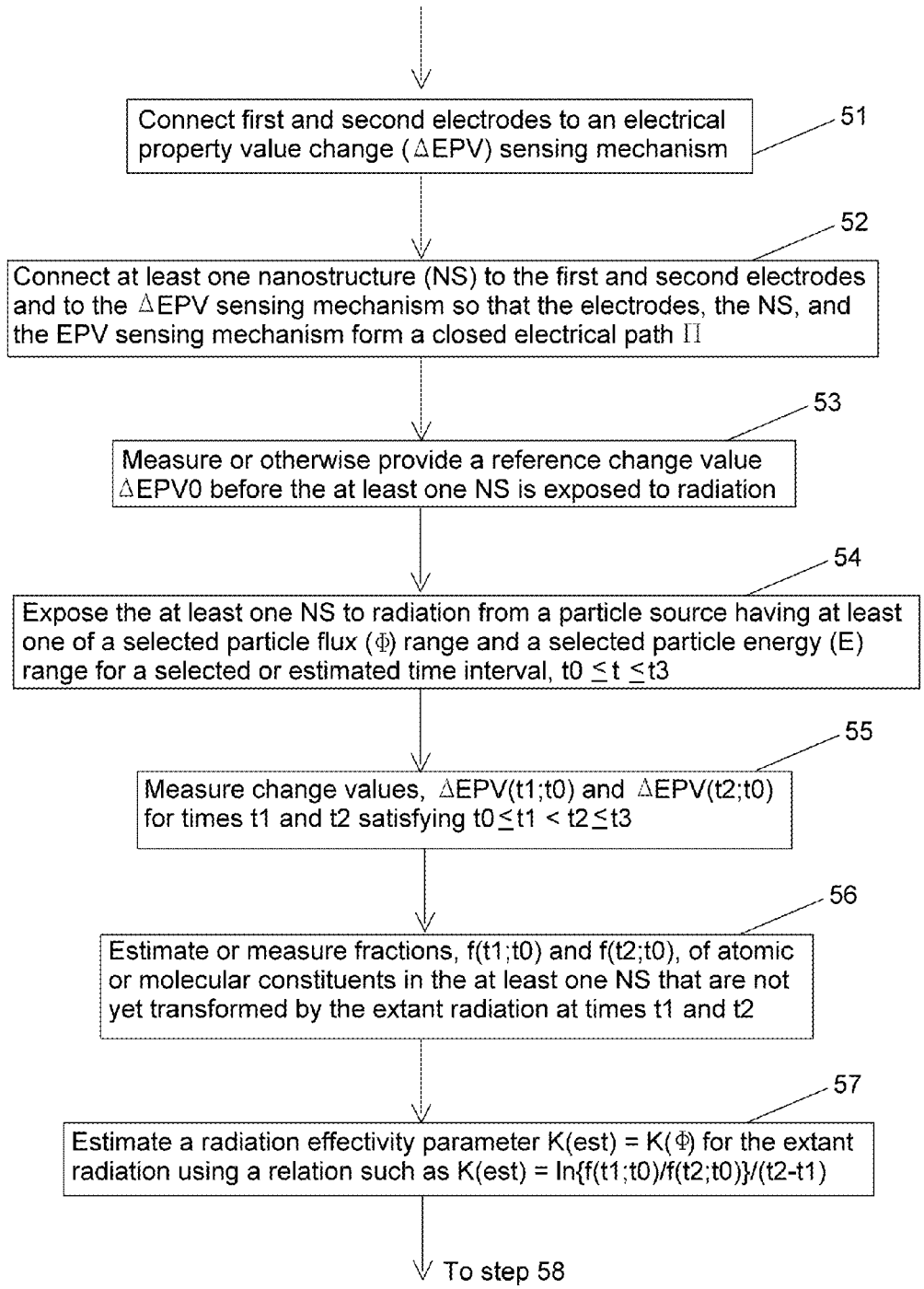
FIGS. 5A and 5B are flow charts of a procedure for estimating radiation flux from measurements of ΔEPV at different times.
Figure 5B:
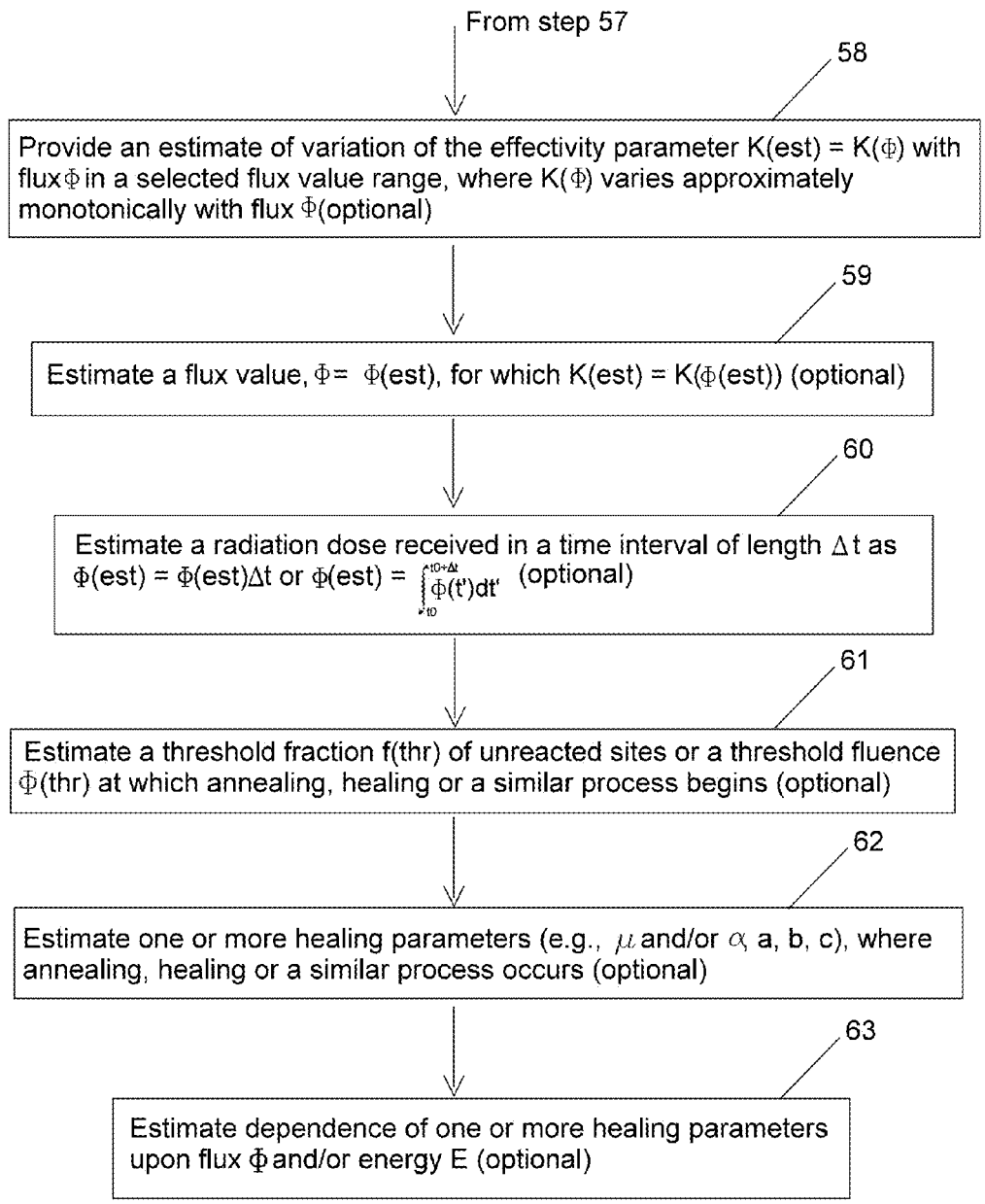

FIGS. 5A and 5B are flow charts of a procedure for estimating flux or dose, using the invention. In step 51, first and second electrodes are provided that are connected to an electrical property value change (ΔEPV) sensing mechanism. In step 52, two or more nanostructures (NSs), such as CNTs, are connected between the first and second electrodes so that the first and second electrodes, the at least two NSs and the ΔEPV sensing mechanism are part of a closed electrical path Π. In step 53, at least one reference electrical property change value ΔEPV0 is measured or otherwise provided before the at least two NSs are exposed to radiation. In step 54, the at least two NSs are exposed to radiation from a particle source having at least one of a selected particle flux (φ) range and a selected average particle energy (E) range for a time interval, t0≤t≤t3.

In step 55, change values, ΔEPV(t0;t1) and EPV(t0;t2), are measured for the EPV for each of at least two time intervals, t0≤t≤t1, and t0≤t≤t2, (t1<t2) within the time interval t0≤t≤t3.

In step 56, a fraction f(t1;t0) of atomic or molecular constituents of the at least two NSs that are unreacted (not yet transformed by the extant radiation) is estimated for time intervals t0≤t≤t1 and t0≤t≤t2, based on a relationship between ΔEPV(t0;t) and f(t;t0). In step 57, a radiation effectivity parameter κ(est)=κ(φ) for the radiation-based transformation of (part of) the at least one NS for constant φ is estimated by a relation, such as $$\kappa(est) = ln\{\{f(t2;unaf) - f_\infty\}/\{f(t1;unaf) - f_\infty\}\}/(t-t1), \quad (4A)$$

In step 58 (optional), an estimate of variation of the radiation effectivity parameter, κ=κ(φ,E), with flux φ is provided (e.g., as in FIG. 4) in a flux value range where κ(φ,E) varies approximately monotonically with flux φ. In step 59 (optional), a flux value φ(est) is estimated for which κ(φ)(est))=κ(est). In step 60 (optional), the dose for the radiation is optionally estimated as $\Phi(est) = \int_{t0}^{t0+\Delta t} \phi(t') \cdot dt'$, where Δt is cumulative irradiation time. Radiation dose Φ(t0;t1;cum) and/or flux φ received by the at least two NSs are estimated from the change values, ΔEPV(t0;t1) and ΔEPV(t0;t2), for example, using Eqs. (1)-(15C).

Where healing or a similar effect occurs, manifested by a marked change in df/dt or $d^2f/dt^2$ (e.g., at least 1-10 percent or present value of f) between the regimes for f(t;unaf) and f(t;heal) at t=t4, a threshold fraction $f_{thr}$ of unreacted sites and/or a threshold dose Φ(thr) is estimated, in step 61 (optional). In step 62 (optional), one or more healing parameters (e.g., μ and/or α, a, b and/or c) is estimated, for example, as discussed in connection with Eqs. (5A)-(9F). In step 63 (optional), dependence, if any, of the parameter(s) μ and/or α, a, b and/or c upon flux φ, and/or energy E is estimated.

Figure 7:
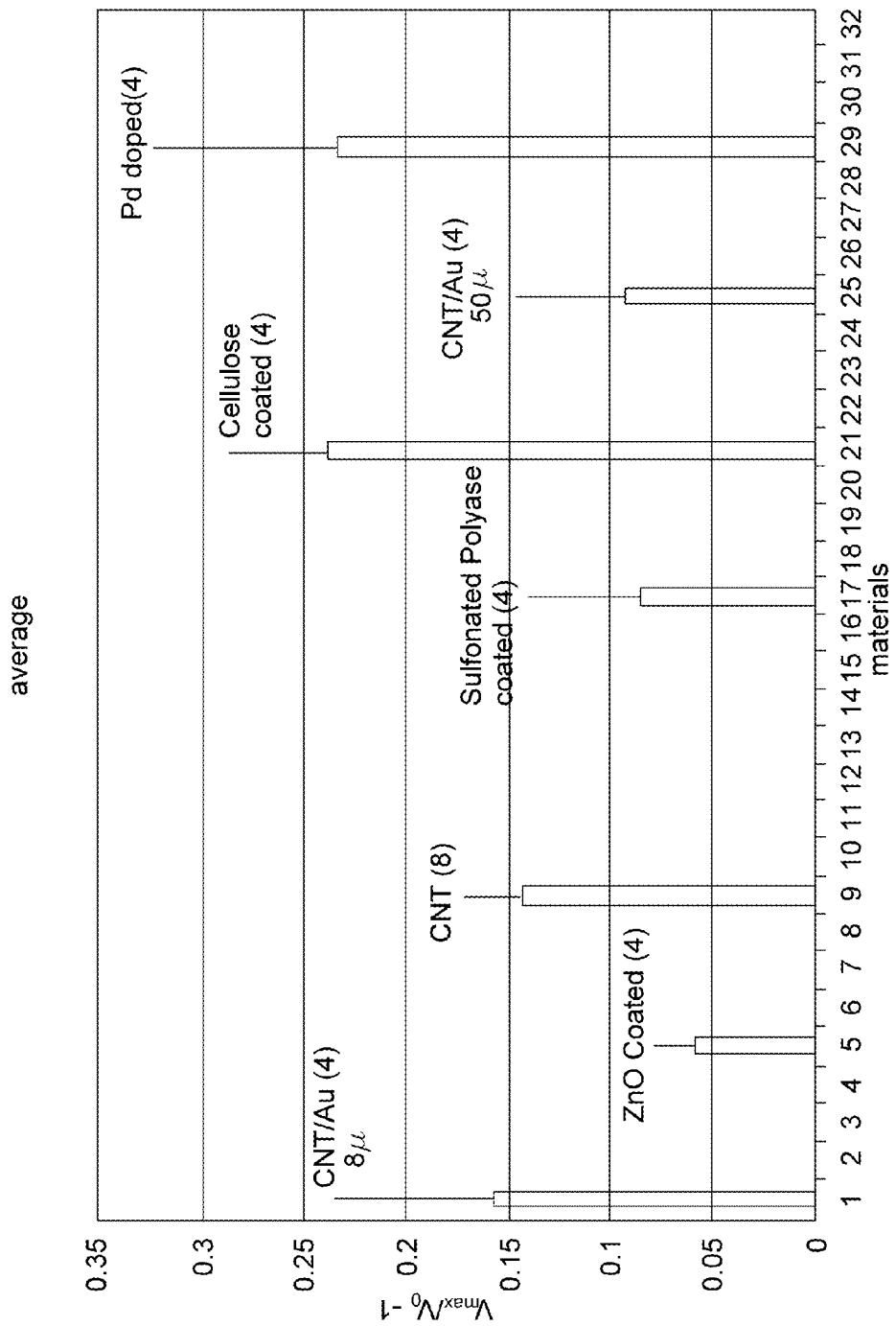
FIG. 7 illustrates differential EPV for different CNT functionalizations.

FIG. 7 graphically displays sensor average differential response ($V_{max}/V_0-1$) for doses in a range between $2 \times 10^7$ and $5 \times 10^{11}$ protons/cm$^2$, for different functionalizing NS loadings: bare CNTs, Au coating across an 8 μm gap, ZnO coating, sulfonated polymer coating, hydroxypropyl cellulose coating, Au coating across a 50 μm gap, and Pd doped. The 50 μm gap Au coating and Pd doping appear to be the most sensitive, producing the highest values ΔEPV(t0;t), for exposure to the proton beam. The relative sensitivity may change with use of a different radiation beam, such as neutrons or X-rays or electrons, depending upon neutron versus proton content, electron configuration, loading thickness and/or related material parameters.

Because CNTs were not destroyed or made inoperable under proton beam irradiation, the Pd dopant remained in the matrix for subsequent sensing of protons. This is also true for an hydroxypropyl cellulose coating of CNTs. Receipt of, and interaction with, protons is detected, for example, by binding to an OH group in cellulose. The sensor response to other gas analytes before and after the proton irradiation is currently being evaluated. All sensors are active for sensing chemicals, and sensor performance tests show that, after irradiation, CNT sensors still respond to a benchmark chemical, $NO_2$ gas, present in ppm concentrations. The detailed changes in sensor response to particular chemical analytes need to be investigated. Other analytes, such as $NH_3$, OH, $C_nH_{2n+2}$ and $C_nH_{2n+1}$(OH) can also be used.

Carbon nanotube-based sensors are particularly suitable and promising for chemical detection and radiation detection, because the technology can be applied to provide gas or liquid chemical sensors that consumes extremely low power, has ultra-miniature size and versatility, and offers cost benefits. Use of low power CNT radiation and chemical sensors will facilitate distributed or wireless sensing, leading to more efficient multi-point measurements, or to greater convenience and flexibility in performing measurements in space as well as on the ground. In addition, CNT-based chemical sensors are suitable for sensing different analytes of interest to the user; and such sensors can be configured in arrays of different configurations to comprehensively and cost-effectively monitor receipt of radiation and presence of multiple analytes.

Cumulative Radiation Effects On ΔEPV.

As irradiation proceeds, from an initial time, t=t0, the ΔEPV(t0;t) response of the loaded and/or unloaded CNTs will likely change with accumulated radiation. Thus, measurements of ΔEPV(t0;t) at two times, t=t1 and t=t2 (>t1) will likely differ from each other in one or more of three situations: (1) additional radiation is received in the interval t1<t<t2 (≤t4), and no healing occurs; (2) additional radiation is received in an interval with t4<t, and healing and/or other atomic and molecular rearrangement effects occur; and (3) no additional radiation is received, and healing and/or other atomic and molecular rearrangement effects may continue.

The situation numbered (1) will manifest a monotonic change (increase or decrease) of ΔEPV(t0;t) with cumulative radiation dose received and may increase monotonically (not necessarily linearly) with Φ, if the dose Φ (assumed to monotonically increase with time t) is below a determinable threshold dose Φ(thr) for this type of radiation, in the absence of subsequent healing. This is seen in FIG. 3, for a time interval t1=128≤t(sec)≤t2=509, where ΔEPV(t0;t)=Δ(voltage) increases approximately linearly with passage of time t and with increase in dose Φ.

FIG. 3 illustrates voltage response, V(t), for five flux/energy situations in a single graph: (1) initially, (φ,E)=(2×10$^7$/cm$^2$-sec, 40 MeV), with flux increasing monotonically to (2) (φ,E)=(5×10$^{11}$/cm$^2$-sec, 40 MeV) over a 1256-sec interval; (3) (φ,E)=(0,0) for a 264-sec interval; (4) (φ,E)=(2×10$^7$/cm$^2$-sec, 10 Mev), with flux increasing monotonically to (5) (φ,E)=(5×10$^{11}$/cm$^2$-sec, 10 MeV) over a 1324-sec interval.

For times 133≤t(sec)≤550, the measured voltage increases from an estimated initial value V(t=133)=0.87 Volts to an estimated value V(t=550)=0.93 Volts. At t=550 sec, healing or a similar reaction begins, and the voltage decreases from 0.93 Volts to 0.925 Volts over the following 111-sec interval. This post-healing behavior might have continued; but at t(sec)=661, the flux was increased monotonically from an initial Φ=2×10$^7$ to φ=5×10$^{11}$, over a time interval 661≤t(sec)≤1189. In an interval 1189≤t(sec)≤1453, the 40 MeV proton beam was turned off (φ=0), and the sensor array appears to have recovered further, with voltage decreasing to 0.90 Volts.

At t=1453 sec, a 10 MeV proton beam with initial flux f=2×10$^7$ was turned on, and voltage increased from 0.90 Volts to 0.92 Volts at t=1849 sec, where healing or a similar reaction began, continuing until an estimated time t=1900 sec, where the voltage had decreased to 0.91 Volts. For a final time interval (1900≤t(sec)≤2377 sec), the voltage again creased from 0.91 Volts to 1.025 Volts.

From time of initiation of the 40 MeV beam until appearance of the first healing behavior, an estimated 416 sec expired. From time of initiation of the 10 MeV beam until appearance of the second healing behavior, an estimated 396 sec expired. The cumulative dose in each of these two intervals is estimated to be substantially the same, which is consistent with the corresponding time interval lengths (416 sec versus 396 sec). This may indicate that initiation of healing behavior is dependent upon cumulative flux but is only weakly dependent upon particle energy (40 MeV versus 10 MeV). When healing begins (at t=550 sec and at t=1849 sec), the ΔEPV(t0;t) change value and the corresponding fraction value f(t;heal) subsequently decrease from their threshold values, as predicted in connection with the discussion of Eqs. (5). The numerical values recited in the preceding two paragraphs are estimates, based upon the graph in FIG. 3.

After substantial healing is initiated, as in situation (2) (e.g., in a time interval t4=509≤t(sec)≤t5=636), while irradiation continues at a constant flux, the change in EPV (i) may increase, but at a lower flux, as reflected in Eq. (6) for f(t;heal; 1); or (ii) may reverse direction, as reflected in Eqs. (10) for f(t;heal;2) with f1<f$_{thr}$<f2. This reversal of direction for EPV appears to occur in the time intervals 509≤t(sec)≤636 and 1778≤t(sec)≤1906. The effects in (i) or in (ii) reduce the magnitude |ΔEPV| of the change with increasing values of Φ, as illustrated in FIG. 3 in the time interval t4=636≤t(sec)≤t5=1144.

When beam irradiation is turned off (situation (3)), as occurs in the time interval 1144≤t(sec)≤1525 in FIG. 3, healing may continue, and the nanostructure recovers toward (but does not reach) its original condition, shown by a decrease in ΔEPV(t;t0) and Δf(t) to a value less than its previous maximum value. This is illustrated in FIG. 3 in the time interval 1144≤t(sec)≤1525. Note that for the time interval 1525≤t(sec)≤2287, where irradiation again resumes with a different proton energy level, the approximately linear increase of ΔEPV with dose Φ resumes, but with a different value of the coefficient α from Eq. (11C). This may indicate one or more effects of the preceding healing and of the preceding cumulative irradiation. The measured effects of cumulative radiation may depend upon the processes and process parameters that preceded the present irradiation process.

From some of the features noted in the graph in FIG. 3, it is clear that a response (ΔEPV) of the sensor array is dependent upon dose Φ, and probably upon flux φ as well. The particular variation of parameters, such as κ(φ,E), represented in FIG. 4, may also vary with particle energy E and with radiation type. When more than one radiation type (known or unknown) is present, it may be difficult to separate the effect(s) of the individual radiation types on a measurable parameter such as ΔEPV.

The results shown graphically in FIG. 3 also indicate that a "healing" effect does appear. The different models for a healing process adopted here (linearly or quadratically dependent upon the unaffected fraction f) manifest different qualitative responses in the healing regime, and a quadratic dependence appears to provide more appropriate behavior in the healing regime, for a proton beam in the energy ranges considered here. This qualitative response may change when a different type of radiation particle is present, or a different energy range is present. If sensor interaction with a particular type of radiation cannot be "healed," the concept of a healing regime may be irrelevant.

Compensation for Radiation Effects on Terminals (Electrodes).

A particle beam will irradiate the CNTs and the terminals (electrodes) at the same flux value φ so that electrode response may also be affected, through electrode material conductivity and/or contact resistance, by the cumulative radiation received (Φ≈φΔt) over a time interval of length Δt. One method of estimating and compensating for the effects of electrode irradiation is the following: (1) provide an assembly of CNTs connecting adjacent electrode fingers 62-m and 62-(m+1) (m=1, 2, 3); (2) measure the voltage difference ΔV(1,4)=V(62-1)−V(62-4), for the two outer electrodes, 62-1 and 62-4, induced by exposure to the radiation; (2) measure the corresponding voltage differences ΔV(1,2)=V(62-1)−V(62-2) and ΔV(3,4)=V(62-3)−V(62-4); (3) subtract the appropriate voltage differences to compute ΔV(2,3)=ΔV(1,4)−ΔV(1,2)−ΔV(3,4), which can be used to compensate for electrode contact resistances and to provide an accurate estimate of the voltage difference attributable to CNTs that connect the fingers 62-2 and 62-3. Alternatively, the electrodes and terminals may be protected by a material or device that acts as a barrier for the incident radiation particles.

Radiation Effects for Different Particle Sources.

Electrically charged particles, such as electrons, charged π-mesons, protons and other ions, may experience an energy transfer that varies roughly linearly with distance traveled in a solid medium. X-rays and gamma rays, if present, may cause atomic rearrangement, such as Auger emission from an atom, or pair production and subsequent charged particle collisions, during passage. Other uncharged particles, such as neutrons, will undergo energy transfer primarily during near encounters with nuclei. Each of these processes has its own energy transfer characteristics and its own potential for atomic and/or molecular rearrangement or damage. A threshold flux for damage from protons may be too low, for example, for damage from neutrons, which can approach a nucleus more closely. Qualitative conclusions, such as the possibility of (partial) recovery of a sensor from irradiation, are likely valid for different, appropriate energy regimes, but the parameter ranges may vary.

FIG. 4 schematically illustrates representative curves for two qualitatively different radiation particles, such as protons/neutrons, protons/electrons, neutrons/electrons, and electrons/X-rays. Character of a radiation curve will depend upon energy E and upon the flux ϕ. Using three or more spaced apart values of flux ϕ, measured or otherwise determined at a known energy level E, the user may distinguish one type of radiation particle from another by comparing different curve pairs and their associated characteristics. For example, each effectivity parameter curve (κ or μ) for a distinct, known radiation type may be approximated by a mixed polynomial κ(ϕ;E) in the flux ϕ and in the energy E.

Optionally, a user would compare an approximation κ(ϕ;E) with measured parameter values for the (initially unknown) radiation type and estimate the radiation type that is "closest" to the polynomial approximations, using a suitable error metric.

Restoration of Initial EPV Values.

EPV values of a nanostructure (NS) arrangement, such as the one illustrated in FIG. 2, can be restored toward the initial EPV value EPV0 (present before any high energy radiation was received by the NS arrangement), by irradiating the NSs with electromagnetic radiation having a wavelength component below 400 nanometers (nm), for a time interval of reasonable length (e.g., Δt=5-300 sec), depending on radiation intensity. The restored EPV values will return toward, but may not reach, the initial values EPV0, because some parts of the radiation-based initial conversion may be irreversible, or because the intensity is insufficient.

Temporal Effects of Irradiation.

FIG. 3 graphically illustrates a change ΔEPV in measured voltage with increasing time t that occurs for each of the two energy levels, E=40 MeV and E=10 Mev. The decreases in voltage (ΔEPV(t0;t)) that occur at t(sec)≈509 (E=40 MeV) and at t(sec)≈1779 (E=10 MeV) may be due to initiation of healing, to an artifact in the sensor(s), or to some other reason that is not yet identified, such as small variations in particle flux. From a comparison of the ΔEPV(t0;t) curves for each of the energy levels, certain observations can be made: (1) when the radiation is terminated (ϕ drops to 0; for example, at t(sec)≈1144), the measured value ΔEPV(t0;t) returns toward, but does not necessarily reach, its initial value (ΔEPV(t0;t)=0); (2) when the radiation is removed and then restored at the same flux (e.g., at t(sec)≈636 and at t(sec)≈1525), the change value ΔEPV(t0;0) again increases, but with a reduced slope; this may indicate a continuing and competing healing effect; (3) the slope of ΔEPV(t0;t) varies with the energy level, being higher for the smaller energy level (E=10 MeV here); this may reflect radiation hardening effects for the E=40 MeV radiation already received; and (4) the maximum ΔEPV(t0;t) value reached with radiation present may decrease with increasing E beyond a transition point. The 10 MeV protons may transfer more energy per unit length to the sensor array than do the 40 MeV protons so that more damage would be expected in this situation.

For use in space operations, this sensor array must be sustainable in a space environment condition, such as combined radiation and microgravity. This initial experiment examined the behavior of the SWCNT-based nanomaterials under exposure to radiation only, and revealed that the SWCNT-based nanomaterials were not damaged by the proton irradiation, and these materials can be used in space.

Once the measurements of ΔEPV(t0;t) and/or ΔEPV(t4;t) are made, conversion of these measurement values to the fraction f(t;unaf) and/or f(t;heal) and estimation of the flux f (initially assumed to be constant) occurs in an additional time interval of length no more than about 10-30 sec. No laboratory processing of data is required, with its concomitant time delays.

Appendix A. Effects of Time Varying Radiation Flux.

The preceding treatment may be generalized, in part, by assuming that the radiation flux f depends upon time t:ϕ=ϕ(t). The initial defining relation, Eq. (1) for a pre-healing regime becomes $$df/dt = -\kappa(t) \cdot (f - f_\infty) \quad (t0 \leq t \leq t3), \tag{A-1}$$

$$\kappa(t) \cdot (t) = \kappa \Phi(t)\}, \tag{A-2}$$

which has a solution $$f(t) = f(t; \text{unaf}) = f_\infty + (f_0 - f_\infty) \exp\{-\int_{t0}^{t} \kappa(t') dt'\} \quad (t \geq t0). \tag{A-3}$$

Where no healing or similar behavior is present, Eq. (A-3) is valid for all times t≥t0.

In a post-healing regime, corresponding to f(t;heal;1) with t≥t4, the defining relation, Eq. (5B), becomes $$df/dt = -\kappa \cdot (f - f_\infty) + \mu\{f_{thr} - f\} = -(\kappa + \mu)\{f - f_h\}, \, (f(t4) = f_{thr}; \, t \geq t4) \tag{A-4}$$

$$f(t) = f_{thr} \exp\{-\int_0^t (\kappa + \mu)(t') dt'\} + \int_0^t (\kappa + \mu) f_h(t') \exp\{-\int (\kappa + \mu)(t'') dt''\} dt' \tag{A-5}$$

$$f_h = (\kappa/(\kappa + \mu)) f_\infty + (\mu/(\mu + \kappa)) f_{thr}, \tag{A-6}$$

$$= f_\infty + (\mu/(\kappa + \mu))(f_{thr} - f_\infty) \tag{A-7}$$

$$= f_{thr} + (\kappa/((\kappa + \mu))(f_\infty - f_{thr}), \tag{A-7}$$

$$(d/dt)\{(f - f_{thr}) \exp\{\int_{t4}^{t} (\kappa(t') + \mu(t')) dt'\}\} = \kappa(t) \, (f_\infty - f_{thr}) \exp\{\int_{t4}^{t} (\kappa(t') + \mu(t')) dt'\} \tag{A-9}$$

$$f(t;\text{heal};1) - f_{thr} = \int_{t4}^{t} \kappa(t') \, (f_\infty - f_{thr}) \exp\{-\int_{t'}^{t} (\kappa(t'') + \mu(t'')) dt''\} \tag{A-10}$$

The radiation effectivity parameter κ(t) can be characterized geometrically as a probability that an incident radiation particle passes sufficiently close to a nanostructure (NS) in the monitor that the EPV value associated with a circuit containing that NS experiences a measurable change. With this geometric characterization adopted, the radiation effectivity parameter κ(t) varies linearly with flux, $$\kappa(t) = \kappa 0 + \kappa 1 \, \phi(t) \tag{A-10}$$

so that κ(t) is characterized by the flux φ(t), with little or no time delay. With this characterization adopted and a given unaffected fraction level $f_{thr}$ adopted as a measure of The healing parameter μ(t) has no obvious relationship to the flux φ(t), and whatever relationship does exist is likely to involve a time delay, corresponding to a time required for the circuit to react. It may be preferable to treat the parameter μ(t) as a constant, independent of flux φ(t) and independent of time t. From Eq. (A-3), the time, t=t4, at which healing begins, if at all, is estimated as the value t4 for which $$\exp\{-\int_{t0}^{t4} \kappa\{\phi(t')\} dt'\} = (f_{thr} - f_\infty)/(f_0 - f_\infty) \quad \text{(A-11)}.$$

The corresponding value, t=t4, is easily determined if the flux f(t) is, or can be approximated as, a polynomial in the time variable t. For example, where flux φ(t) is increasing linearly with time t, as occurs in FIG. 3, the healing initiation time, t=t4, in Eq. (A-11) becomes a solution of a quadratic equation.

Analyzing the healing solution f(t;heal;1) in Eq. (C-9) and the fact that $f_\infty < f_{thr}$, one can show that, for t increasing above t4, where healing is just beginning, the unaffected fraction f(t;heal;1) will initially increase below $f_{thr}$. However, a monotonic increase of flux with time, as in FIG. 3, will ultimately overwhelm the system, and f(t;heal;1) will thereafter decrease, as indicated in FIG. 3.

Appendix B. Estimation of Maximum Biological Exposure.

The preceding formalism can be applied to estimate when a threshold cumulative dose of radiation Φ(cum) (e.g., beyond which undesired biological effects will occur) will be reached for a particular radiation source. Preferably, the dose received should stay below this threshold amount. In a pre-heal regime with substantially constant flux, this dose is reached at a cumulative time of exposure estimated to be $$\Delta t(\text{cum}) = (1/\kappa(\phi)) = (t2-t1)/\ln\{f(t1;\text{unaf})/f(t2;\text{unaf})\} \quad \text{(B-1)},$$

where t1, t2 and f(t;unaf) are quantities determined in connection with Eq. (4A). $\kappa(\phi) = \ln\{f(t1;\text{unaf})/f(t2;\text{unaf})\}/(t2-t1)$, Where healing is present and the elapsed time $$t_{thr} - t0 = t4 - t0 = (1/\kappa(\phi)) \ln\{f0/f(\text{thr})\} \quad \text{(B-2)}$$

at which healing begins is greater than the threshold time Δt(cum), the threshold time should be determined with reference to the healing regime.

What is claimed is:

1. A method for real time monitoring of radiation received, the method comprising:
providing an array of at least two spaced apart nanostructures (NSs) that each extend between and electrically connect first and second terminals of an electrical property change value sensing mechanism, to form a closed electrical path, where the sensing mechanism senses a change value ΔEPV in a selected electrical property value EPV associated with the at least two nanostructures;
providing the at least two NSs with a selected coating or dopant to functionalize the at least two NSs to respond to exposure to incident radiation by a change value ΔEPV in the electrical property value;
providing or measuring at least one initial electrical parameter value EPV0 for the closed electrical path before exposure of the at least two NSs to incident radiation;
exposing the at least two NSs to the incident radiation from a source of incident radiation particles having a representative particle flux φ and a representative particle energy E;
measuring change values, ΔEPV(t0;t1) and ΔEPV(t0;t2), in the electrical property value EPV for measurement time intervals, t0≤t≤t1 and t0≤t≤t2, within a selected time interval t0≤t≤t3 with t0≤t1<t2≤t3, for the closed electrical path, as a result of exposure of the at least two NSs to the incident radiation;
estimating a change value difference value ΔEPV (t1;t2)=ΔEPV(t0;t2)−ΔEPV(t0;t1);
providing a first correspondence or mapping that relates at least one of a dose Φ(t1;t2;cum) and the particle flux φ to a time rate of change df/dt in a first fractional value f(t;unaf) (0<f(t;unaf)≤1) of the at least two NSs that have received and reacted to receipt of the incident radiation in the measurement time interval, t1≤t≤t2, in a pre-heal time interval, where healing of the NS array has not yet begun, where t0 is an initial time and f0=f(t=t0;unaf);
providing a second correspondence or mapping that relates the at least one EPV change value ΔEPV(t1;t2) to a first fractional change value, Δf(t1,t2;unaf)=f(t2;unaf)−f(t1;unaf); and
combining the first and second correspondences to relate dose or cumulative radiation received Φ(t1;t2;cum) by the at least two NS s in the time interval t1≤t≤t2, where healing has not yet begun, to the at least one change value ΔEPV(t1;t2),
whereby, when healing has not yet begun, an estimate of cumulative radiation dose received is provided at a time no more than about 10-30 seconds after the change values, ΔEPV(t0;t1) and ΔEPV(t0;t2) are completed.

2. The method of claim 1, further comprising choosing said second mapping to be of the form ΔEPV(t1;t2)=η1+η2 Δf(t1, t2;unaf), where η1 and η2 are real coefficients that can be estimated from one or both of said measurements ΔEPV(t0; t1) and ΔEPV(t0;t2).

3. The method of claim 1, further comprising drawing said radiation particle source from a group of radiation sources consisting of a proton source, a neutron source, an ion source, a molecular beam source, an electron beam source, an ultraviolet source, and an X-ray source.

4. The method of claim 1, further comprising selecting said coating to comprise at least one of Au, ZnO, a sulfonated polymer, and hydroxypropyl cellulose.

5. The method of claim 1, further comprising selecting said dopant to comprise at least one of Ti, Ta, Pd, Pt and Ni.

6. The method of claim 1, further comprising
exposing said at least two NSs to said incident radiation within said selected time interval, t1≤t≤t2;
estimating or measuring said change value ΔEPV(t1;t2) for said at least two NSs for said at least one time interval, t1≤t≤t2, by estimating or measuring a first order time rate of change, df/dt, of said first fractional value f=f(t; unaf) of atomic or molecular constituents of said at least two NSs that are unaffected or not yet affected as a result of exposure to said incident radiation in said selected time interval t0≤t≤t3;
representing the first order time rate of change of said first fractional value f(t;unaf), in a regime where healing is absent or has not yet occurred, according to a relation df/dt=−κ{f(t;unaf)−$f_\infty$}, where κ is a radiation effectivity parameter, corresponding to said incident radiation having said particle flux φ, and $f_\infty$ is a non-negative asymptotic value of said first fractional value f(t;unaf), as time t increases without limit;
estimating the parameter κ as κ(est) using at least one measurement of EPV change values ΔEPV(t0;t1) and ΔEPV(t0;t2); and providing an estimation of the parameter κ as a function of said flux φ for a range of said flux in which κ is s approximately constant or varies approximately monotonically with φ.

7. The method of claim 6, further comprising:
providing said flux φ as a approximately constant flux; and
providing measurements, f(t1;unaf) and f(t2;unaf) of said first fractional value f(t;unaf) at said two spaced apart time values, t=t1 and t=t2 (>t1); and estimating a value of said parameter κ as κ(est)=$ln${f(t1;unaf)/f(t2;unaf)}/(t2−t1).

8. The method of claim 6, further comprising:
providing said flux φ as a approximately constant flux;
providing measurements, f(t1;unaf) and f(t2;unaf) of said first fractional value f(t;unaf) at two spaced apart time values, t=t1 and t=t2 (>t1); and
estimating said asymptotic value $f_\infty$ of said first fractional value in absence of healing, as time t increases without limit, as $f_\infty$=f(t1;unaf)−{f(t1;unaf)−f(t2;unaf)} {1−exp{−κ(t2−t1)}}.

9. The method of claim 6, further comprising estimating that said healing is present when a first order time rate of change df/dt of said first fractional value f at a first time, t=t1', arbitrarily close to but less than an estimated pre-healing/healing transition time, t=t4, changes, by an amount at least equal to 1-10 percent of a present value of f, from a first order time rate of change value, $\{df/dt\}_{t1'}$, to a first order time rate of change value $\{df/dt\}_{t2'}$, at a second time, t=t2', arbitrarily close to but greater than the estimated transition time, t=t4.

10. The method of claim 6, further comprising estimating that said healing is present when a second order time rate of change $d^2f/dt^2$ of said first fractional value f at a first time, t=t1', arbitrarily close to but less than an estimated transition time, t=t4, changes, by an amount at least equal to 1-10 percent of a present value of f, from a second order time rate of change value, $\{d^2f/dt^2\}_{t1'}$, to a second order time rate of change value, $\{d^2f/dt^2\}_{t2'}$, at a second time, t=t2', arbitrarily close to but greater than the estimated transition time, t=t4.

11. A method for real time monitoring of radiation received, the method comprising:
providing an array of at least two spaced apart nanostructures (NSs) that each extend between and electrically connect first and second terminals of an electrical property change value sensing mechanism, to form a closed electrical path, where the sensing mechanism senses a change ΔEPV in a selected electrical property value EPV associated with the at least two nanostructures;
providing or measuring at least one initial electrical parameter value EPV0 for the closed electrical path before exposure of the at least two NSs to incident radiation;
exposing the at least two NSs to incident radiation from a source of incident radiation particles having a representative particle flux φ and a representative particle energy E;
measuring change values, ΔEPV(t4;t5) and ΔEPV(t4;t6), in the electrical property value EPV for measurement time intervals, t4≤t≤t5 and t4<t<t6, within a selected time interval t4≤t≤t7 with t4≤t5<t6≤t7, for the closed electrical path, as a result of exposure of the at least two NSs to the incident radiatio, where healing of the NS array has begun for at least one time t>t4;
estimating a change value ΔEPV(t5;t6)=ΔEPV(t0;t6)−ΔEPV(t0;t5);
providing a third correspondence or mapping that relates at least one of a dose Φ(t5;t6;cum) and the particle flux φ to a time rate of change df/dt in a second fractional value f(t;heal) (0<f(t;heal)≤1) of the at least two NSs that have received and reacted to receipt of the incident radiation in the measurement time interval, t5≤t≤t6, in a heal time interval in which healing of the NS array has begun;
providing a fourth correspondence or mapping that relates the at least one EPV change value ΔEPV(t5;t6) to a second fractional change value, Δf(t5,t6;heal)=f(t6;heal)−f(t5;heal); and
combining the third and fourth correspondences to relate dose or cumulative radiation received Φ(t5;t6;cum) by the at least two NSs in the time interval t5≤t≤t6, where healing has begun, to the change value ΔEPV(t5;t6),
whereby, when healing has begun, an estimate of cumulative radiation dose received is provided at a time no more than about 30 seconds after the time t=t6.

12. The method of claim 11, further comprising choosing said third mapping to be of the form ΔEPV(t5;t6)=η3+η4 Δf(t5,t6;unaf), where η3 and η4 are real coefficients that can be estimated from one or both of said values ΔEPV(t4;t5) and ° EPV(t4;t6).

13. The method of claim 11, further comprising drawing said radiation particle source from a group of radiation sources comprising a proton source, a neutron source, an ion source, a molecular beam source, an electron beam source, an ultraviolet source, and an X-ray source.

14. The method of claim 11, further comprising providing said at least two NSs with a selected coating or doping to functionalize said at least two NSs to respond to exposure to said incident radiation by said change value ΔEPV(t5;t6), in said electrical property value.

15. The method of claim 14, further comprising selecting said coating to comprise at least one of Au, ZnO, a sulfonated polymer and hydroxypropyl cellulose.

16. The method of claim 14, further comprising selecting said dopant to comprise at least one of Ti, Ta, Pd, Pt and Ni.

17. The method of claim 11, further comprising
exposing said at least two NSs to said incident radiation from said radiation source within said time interval, t4≤t≤t7, where t4 is an estimated time for transition to said healing regime;
estimating or measuring said change value ΔEPV(t5;t6) for said at least two NSs for said time interval, t5≤t≤t6, by estimating or measuring a first order time rate of change, df/dt, of said second fractional value f=f(t;heal;1) of atomic or molecular constituents of said NS array for which healing has begun, after exposure to said incident radiation in said time interval t5≤t≤t6;
representing the first order time rate of change, in a regime where healing is present, according to a relation df/dt=−κf(t;heal;1)−$f_\infty$)+μ{$f_{thr}$−f(t;heal;1)} of said second fractional value f=f(t;heal;1) of atomic or molecular constituents of said NS array that is unaffected or has been healed or reconverted to an unaffected state, where κ is a radiation effectivity parameter in a regime where healing is not present or has not yet occurred, and μ is a healing effectivity parameter, corresponding to said incident radiation with said flux φ;
estimating the parameters κ and μ as κ(est) and μ(est) using a measurement of at least two of EPV change values, ΔEPV(t4;t5) and ΔEPV(t4;t6);
providing or estimating an approximation for said parameter κ, κ=κ(est), as a function of said flux φ for a range of said flux in which κ is approximately constant or varies approximately monotonically with φ;
providing an estimate φ(est) of said flux φ for which κ(est)=κ(φ=φ(est));

estimating said flux of said incident radiation to be $\phi(est)$; and estimating a value for the healing effectivity parameter $\mu$.

18. The method of claim 17, further comprising:

providing said flux $\phi$ as approximately constant flux; and estimating said second fractional value f(t;heal;1) in said healing regime as $$f(t;\text{heal};1)=(f_{thr}-f_h)\exp\{-(\mu+\kappa)(t-t4)\}+f_h, (t \leq t4), f_h = (\kappa/(\kappa+\mu))f_\infty+(\mu/(\mu+\kappa))f_{thr},$$

where t4 is an estimated time for transition to said healing regime.

19. The method of claim 18, further comprising estimating a sum of said parameters $\mu+\kappa$ as $$(\mu+\kappa)(est)=ln\{\{f(t7;\text{heal};1)-f(t5;\text{heal};1)\}/\{f(t6;\text{heal};1)-f(t5;\text{heal};1)\}\}/(t6-t5),$$

where f(tk;heal;1) (k=5, 6, 7) is an estimated value of said second fractional value f(t;heal;1) in said healing regime, with t5, t6 and t7 satisfying t4≤t5<t6<t7 and satisfying t7−t5=2(t6−t5).

20. The method of claim 18, further comprising:

providing an approximation of said parameter $\kappa$ as a function of said flux $\phi$ for a range of said flux in which $\kappa$ is approximately constant or varies approximately monotonically with $\phi$;

providing an estimate $\phi(est)$ of said flux $\phi$ for which $\kappa(est)=\kappa(\phi=\phi(est))$;

estimating said flux of said incident radiation to be $\phi(est)$; and estimating a value for said healing effectivity parameter $\mu(est)$ from a relation $\mu(est)=(\kappa+\mu)(est)-\kappa(\phi=\phi(est))$.

\* \* \* \* \*